(12) United States Patent
Heath

(10) Patent No.: US 8,746,742 B2
(45) Date of Patent: Jun. 10, 2014

(54) SEATBELT TENSION ADJUSTMENT DEVICE

(76) Inventor: Leroy Heath, Brandon, FL (US)

( * ) Notice: Subject to any disclaimer, the term of this patent is extended or adjusted under 35 U.S.C. 154(b) by 126 days.

(21) Appl. No.: 13/561,795

(22) Filed: Jul. 30, 2012

(65) Prior Publication Data
US 2014/0027213 A1    Jan. 30, 2014

(51) Int. Cl.
B60R 22/00    (2006.01)

(52) U.S. Cl.
USPC .......... 280/801.1; 280/806; 280/808; 24/170; 24/590.1

(58) Field of Classification Search
USPC .............. 280/801.1, 806, 808; 24/170, 590.1, 24/593.11
See application file for complete search history.

(56) References Cited

U.S. PATENT DOCUMENTS

| | | | |
|---|---|---|---|
| 115,654 A | 6/1871 | Stephens | |
| 3,646,644 A | 3/1972 | Watts | |
| 4,038,726 A | 8/1977 | Takabayashi | |
| 4,371,192 A | 2/1983 | Alix | |
| 4,726,625 A | 2/1988 | Bougher | |
| 4,826,250 A | 5/1989 | Ibanez | |
| 4,893,835 A | 1/1990 | Linden | |
| D308,817 S | 6/1990 | Steinbeck et al. | |
| 5,050,272 A | 9/1991 | Robinson et al. | |
| 5,186,520 A | 2/1993 | Whitaker et al. | |
| 5,201,099 A | 4/1993 | Campbell | |
| 5,350,196 A | 9/1994 | Atkins | |
| 5,379,489 A | 1/1995 | Delk et al. | |
| D360,288 S | 7/1995 | Freeman et al. | |
| 5,653,003 A * | 8/1997 | Freeman | 24/543 |
| 5,870,816 A * | 2/1999 | McFalls et al. | 29/434 |
| 6,230,370 B1 * | 5/2001 | Nelsen | 24/68 CD |
| 6,312,015 B1 | 11/2001 | Merrick et al. | |
| 6,390,562 B1 * | 5/2002 | Takamizu et al. | 297/483 |
| 6,588,068 B1 * | 7/2003 | Wang | 24/171 |
| 6,592,149 B2 | 7/2003 | Sessoms | |
| 7,004,547 B1 | 2/2006 | Cheng | |
| 7,036,849 B2 | 5/2006 | Drinkrow | |
| 7,131,169 B2 * | 11/2006 | Folkmar | 24/30.5 R |
| 7,185,919 B2 | 3/2007 | Mather et al. | |
| 7,240,405 B2 | 7/2007 | Webber et al. | |
| 7,249,397 B2 * | 7/2007 | Abels et al. | 24/132 R |
| 7,808,386 B1 * | 10/2010 | Sayegh et al. | 340/572.1 |
| 7,904,997 B2 * | 3/2011 | Foubert | 24/631 |
| 8,052,170 B2 * | 11/2011 | Pelliccia et al. | 280/808 |
| 8,303,043 B2 * | 11/2012 | Humbert | 297/477 |
| 8,327,513 B2 * | 12/2012 | Keene et al. | 24/638 |
| 8,393,645 B2 * | 3/2013 | Wiseman et al. | 280/808 |
| 2003/0140461 A1 | 7/2003 | Wilcock | |
| 2007/0193004 A1 | 8/2007 | Chou | |

FOREIGN PATENT DOCUMENTS

FR    2682655    4/1993

OTHER PUBLICATIONS http://www.comfortableseatbeltclip.com/solution-for-uncomfortable-driving-position.html.

* cited by examiner

Primary Examiner — Toan To
(74) Attorney, Agent, or Firm — Jason T. Daniel, Esq.; Daniel Law Offices, P.A.

(57) ABSTRACT

A seatbelt tension adjustment device includes an elongated upper body having a downward facing protrusion that is pivotally secured to a lower body having a box-like shape. The lower body including an upper surface for receiving the protrusion and an internal cavity for positioning a paddle drum therein. The paddle drum working in unison with the downward facing protrusion to engage a seatbelt in an adjustable manner.

10 Claims, 6 Drawing Sheets

SEATBELT TENSION ADJUSTMENT DEVICE

TECHNICAL FIELD

The present invention relates generally to automotive devices, and more particularly to a seatbelt tension adjustment device capable of allowing a user to adjust the tension/pull produced by an automotive seatbelt during non emergency use.

BACKGROUND

The statements in this section merely provide background information related to the present disclosure and may not constitute prior art.

Each year, there are over 34,000 fatalities resulting from automotive accidents in the United States alone. Of these fatalities, it is estimated that more than 17,000 were not wearing their seatbelts at the time of the accident.

One of the most common reasons people do not wear seatbelts revolves around comfort. Unlike earlier models which included spring loaded adjustable locks, modern automotive seatbelts do not allow a user to control the tension of the belt when it is in use. As a result, the seatbelt applies a constant pressure to the thighs, neck breastbone and shoulders of the user. This constant pulling motion can wrinkle clothing and cause pain to those individuals suffering from ailments in the portions of the body where the seatbelt makes contact. Moreover, children are especially prone to unclip their seatbelt due to this constant pressure applied by the mechanism.

Accordingly, it would be beneficial to provide a device capable of allowing a user to quickly and easily adjust a seatbelt tension that does not interfere with the vehicle safety features incorporated into the seatbelt itself, the vehicle air bags, vehicle weight sensors, and/or seat belt alarms.

SUMMARY OF THE INVENTION

The present invention is directed to a seatbelt tension adjustment device. One embodiment of the present invention can include an elongated upper body having a downward facing protrusion that is pivotally secured to a lower body having a box-like shape. The lower body including an upper surface for receiving the protrusion and an internal cavity for positioning a paddle drum therein. The paddle drum working in unison with the downward facing protrusion to engage a seatbelt in an adjustable manner.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
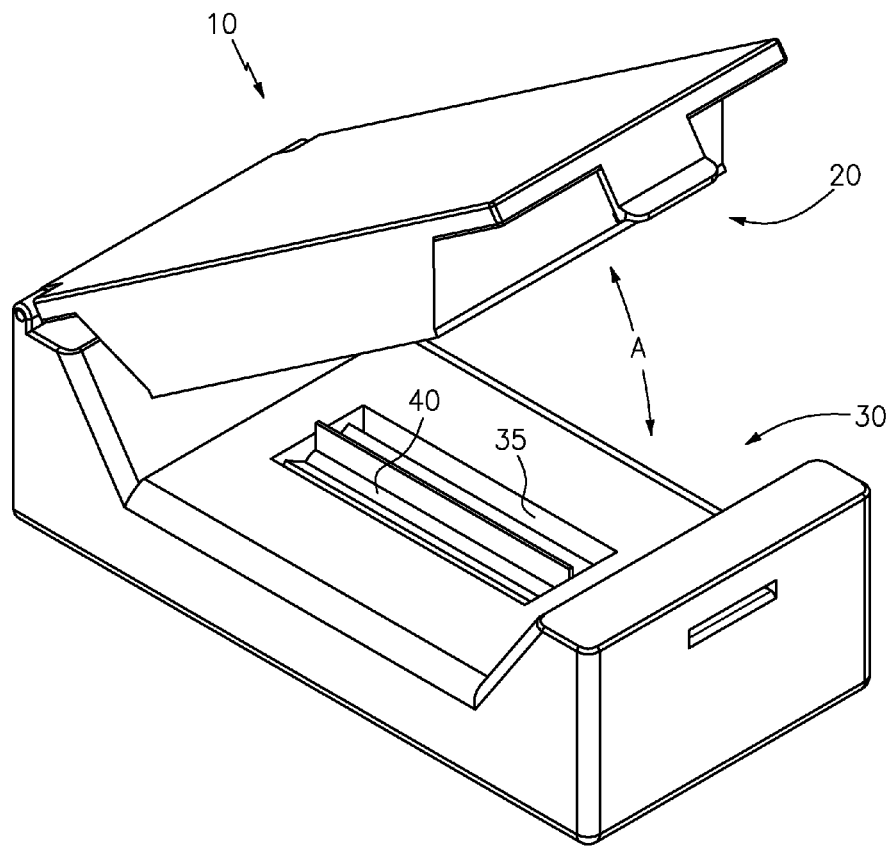
FIG. 1 is a perspective view of a seatbelt tension adjustment device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described throughout this document, the tension/pulling motion imparted onto a user by a seatbelt system can vary depending on the make, model and manufacturer of the seatbelt system. Accordingly, it is understood to those of skill in the art that the pressure with which the presently described device will impart onto a seatbelt when secured thereon will be sufficient to overcome the tension/pulling motion of any conventional seatbelt system during non-emergency use.

As illustrated in FIG. 1, one embodiment of a seatbelt tension adjustment device 10 can include an upper body 20 that is pivotally/swingably secured (see arrow A) to a lower body 30 which includes a cavity 35 for positioning a rotatable drum 40 for engaging a seat belt. As will be described below in detail, the device 10 can act to allow a user to adjust the tension applied to the users body by an automotive seatbelt.

Figure 2A:
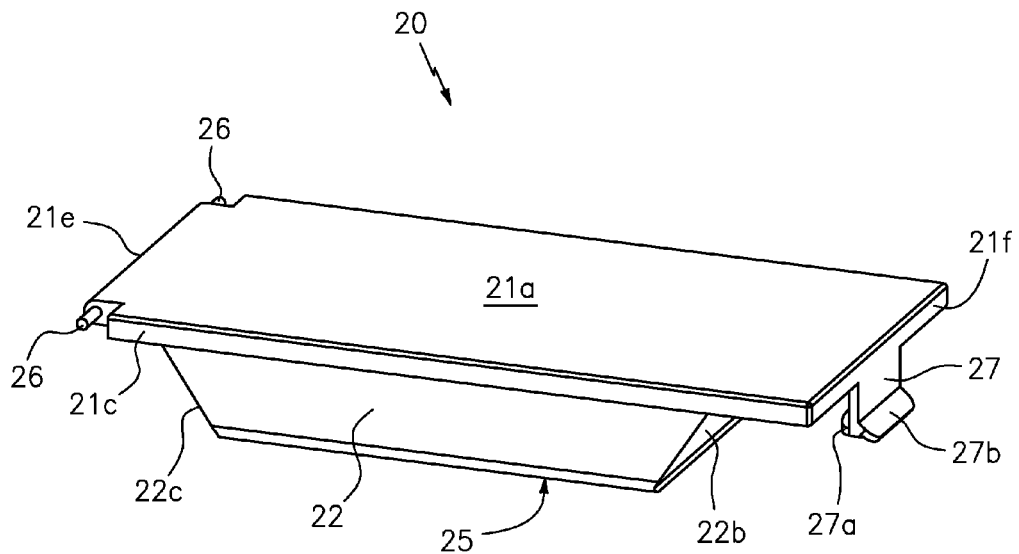
FIG. 2a is a side view of the upper body of the seatbelt tension adjustment device in accordance with one embodiment of the invention.
Figure 2B:
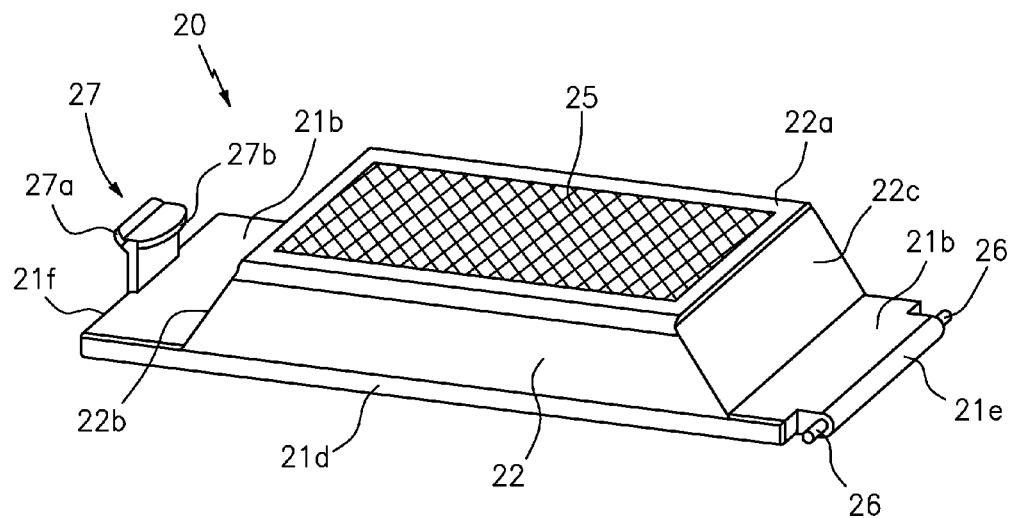
FIG. 2b is another side view of the upper body of the seatbelt tension adjustment device in accordance with one embodiment of the invention.

FIGS. 2a and 2b illustrate one embodiment of the upper body 20 of the device 10. As shown, the upper body can include an elongated, generally rectangular member having a top surface 21a, a bottom surface 21b, opposing side surfaces 21c and 21d, and a pair of opposing end surfaces 21e and 21f, respectively. The bottom surface 21b can further include a downward protruding section 22 having a generally flat bottom surface 22a and a pair of angled side surfaces 22b and 22c.

In one embodiment, a cushion pad 25 can be secured to the bottom surface of the protrusion 22a in order to engage an automotive seat belt. In one preferred embodiment, the cushion pad 25 can include a thin strip of rubber that is permanently secured to the bottom of the protrusion 22a via an adhesive such as glue or resin, for example. Alternatively, the cushion pad 25 can be constructed from any number of known materials capable of providing a soft, flexible surface such as neoprene or cotton, for example.

The upper body 20 can also include a pair of nubs 26 and a retention clip 27. As shown, the nubs 26 can extend laterally from the side surfaces 21c and 21d at a location adjacent to the end surface 21e, and the retention clip 27 can include an inward facing protrusion 27a and an outward facing protrusion 27b. The retention clip 27 can be positioned along the bottom surface 21b at a location adjacent to the end surface 21f. As will be described below, the nubs 26 and retention clip 27 will act in unison to allow the upper body to move from an open position to a closed and locked position with the lower body 30.

In one preferred embodiment, the upper body 20 can be constructed from a single mold of injected plastic. Of course, any number of other construction materials such as PVC, metal and wood, for example, can also be utilized.

Figure 3:
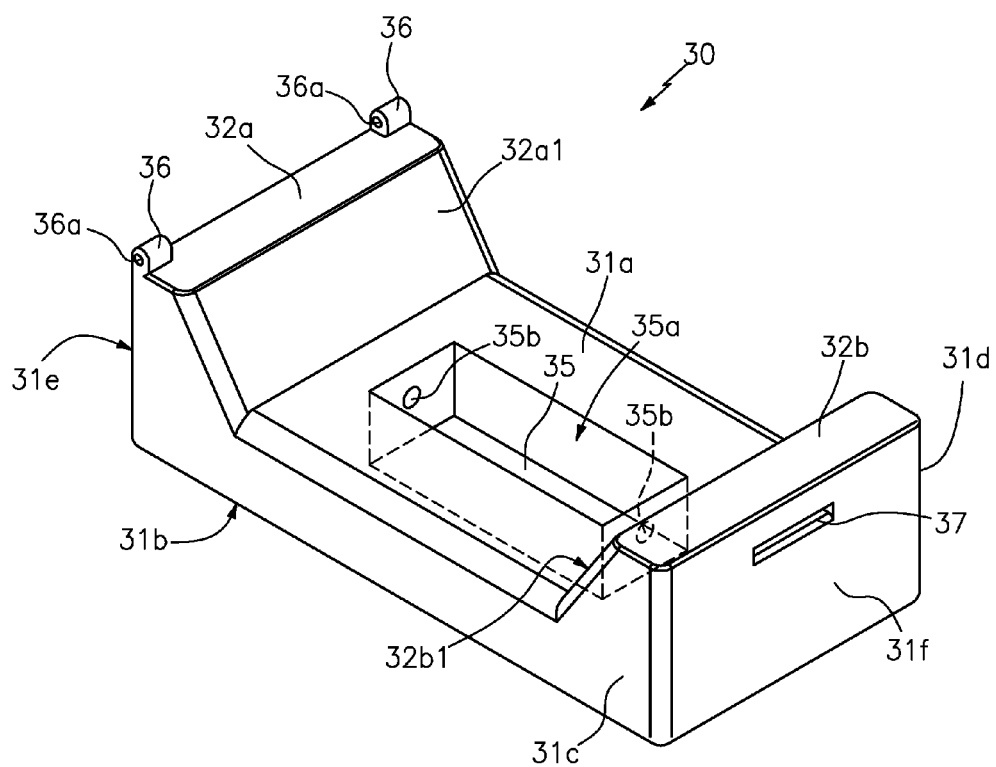
FIG. 3 is a perspective view of the lower body of the seatbelt tension adjustment device in accordance with one embodiment of the invention.

FIG. 3 illustrates one embodiment of the lower body 30 of the device 10. As shown, the lower body can include an elongated, generally rectangular box-like shape having a top surface 31a, a bottom surface 31b, opposing side surfaces 31c and 31d, and a pair of opposing end surfaces 31e and 31f. The top surface 31a can further include a pair of upward protruding sections 32a and 32b located adjacent to end surfaces 31e and 31f, respectively.

Upward protruding sections 32a and 32b can each include an angled side section 32a1 and 32b1, respectively sloping inward towards the center of the device. Angled side sections 32a1 and 32b1 can be complementary to angled side sections 22c and 22b, respectively, in order to allow the lower body 30 to receive the protrusion 22 of the upper body 30 when the device is in a closed position (See FIG. 5).

The lower body 30 can further include a cavity 35 that is accessible via an elongated opening 35a within the top surface 31a. The cavity 35 can also include a pair of opposing drum receivers 35b positioned therein. As described herein, drum receivers 35b can preferably include small divots/holes having a suitable dimension for receiving the ends 43 of the roller drum 40 described below. Alternatively, roller holders can include any number of conventional hardware for receiving the ends of the roller and securely positioning the same in a manner that allows the roller to spin/rotate in place (see arrow B of FIGS. 4b and 4c).

A pair of nub receivers 36 can be secured to the upper portion of the protrusion 32a, each of the nub receivers can include a raised member having an opening 36a disposed therein for receiving the nubs 26 of the upper body. As shown by arrow A, when the nubs 26 are secured within the nub receivers 36 the upper body can act to swing from an upright/open position (See FIG. 1) to closed position (See FIG. 5). A retention clip receiver 37 can be located along the end side 31f. As shown, the clip receiver 37 can include an inward radiating cavity for receiving the inward facing protrusion 27a of the retention clip when the device is in the closed position.

In one preferred embodiment, the lower body 30 can be constructed from a single mold of injected plastic. Of course, any number of other construction materials such as PVC, metal and wood, for example, can also be utilized. Moreover, although described herein as including a specific shaped retention clip, nubs, and associated receivers, this is for illustrative purposes only. To this end, one of skill in the art will recognize that any number of other types of attachment units capable of securing the upper body to the lower body in a moveable and lockable manner can be utilized. Such hardware including but not limited to conventional hinges, and locking mechanisms such as buttons, snaps, magnetic elements and the like.

Figure 4A:
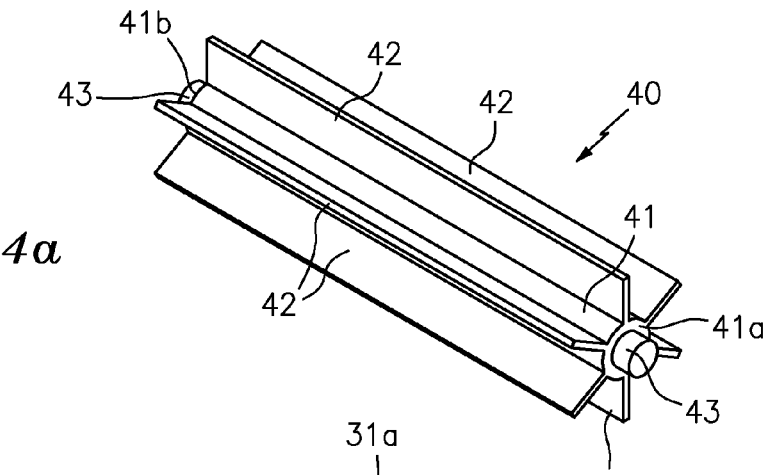
FIG. 4a is a perspective view of the paddle drum of the seatbelt tension adjustment device in accordance with one embodiment of the invention.
Figure 4B:
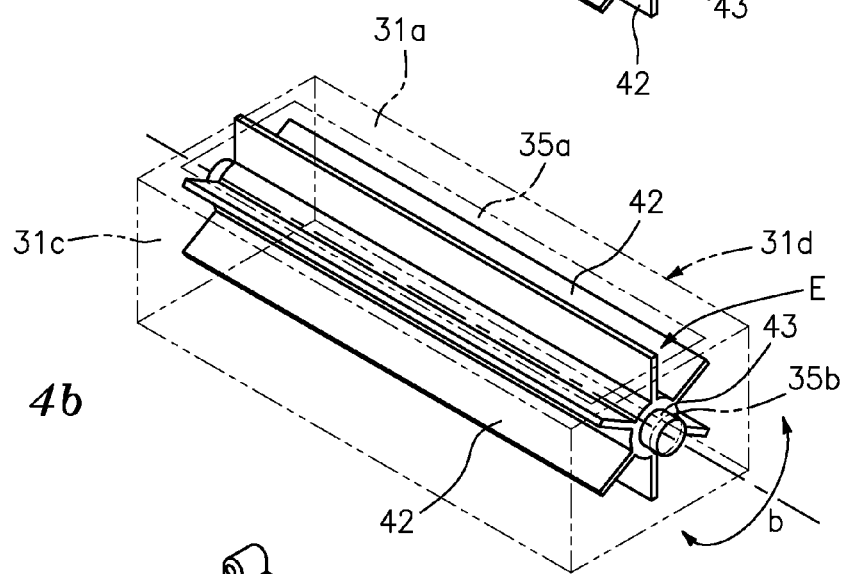
FIG. 4b is an end side view of the paddle drum within the lower body of the seatbelt tension adjustment device in accordance with one embodiment of the invention.
Figure 4C:
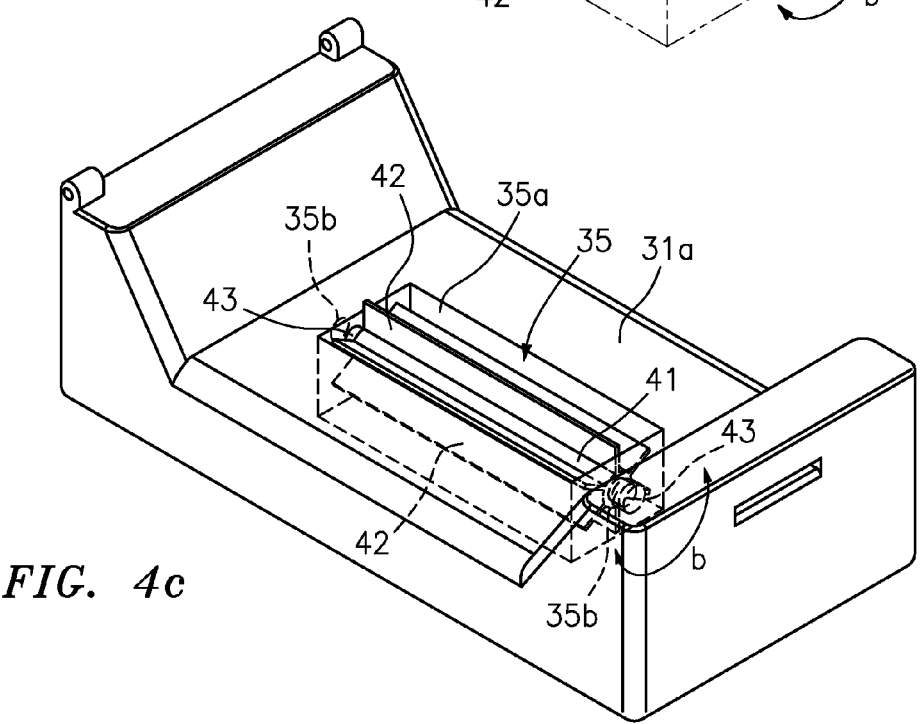
FIG. 4c is a perspective view of the paddle drum within the lower body of the seatbelt tension adjustment device in accordance with one embodiment of the invention.

FIGS. 4a-4c illustrate one embodiment of the paddle drum of the device 10. As shown, the drum 40 can include an elongated cylindrical member 41 having a pair of opposing ends 41a and 41b and a plurality of orthogonal vanes/paddles 42 disposed thereon. A small protruding drum nipple 43 can be arranged in the center of each drum end 41a and 41b. The nipples 43 can include a dimension that is smaller than the dimension of the drum receivers 35b in order to allow the drum to freely rotate when positioned within the cavity 35, as shown by arrow b.

In one preferred embodiment, the cylindrical member 41, and the nipples 43 can be constructed from a single mold of injected plastic, and will include six individual paddles 42 that are evenly spaced along the cylindrical member and are constructed from soft plastic or rubber that is conventionally secured to the cylindrical member via known construction techniques such as adhesive or compression fittings, for example. Of course, any number of other materials and number of paddles are also contemplated. Moreover, in another embodiment, each of the cylindrical member and the paddles can be constructed from injection molded plastic, and a rubber coating can be adhered to the paddles. The rubber coating being useful for engaging the seatbelt in a nonslip manner.

As shown best in FIG. 4b, when the drum 40 is positioned onto the drum receivers 35b, the uppermost paddle 42 will extend E through the opening 35a of the top surface of the lower body 30. Such a feature will allow the paddle to engage a seatbelt 5 when the device is in a closed position, as will be described below in detail.

Figure 5:
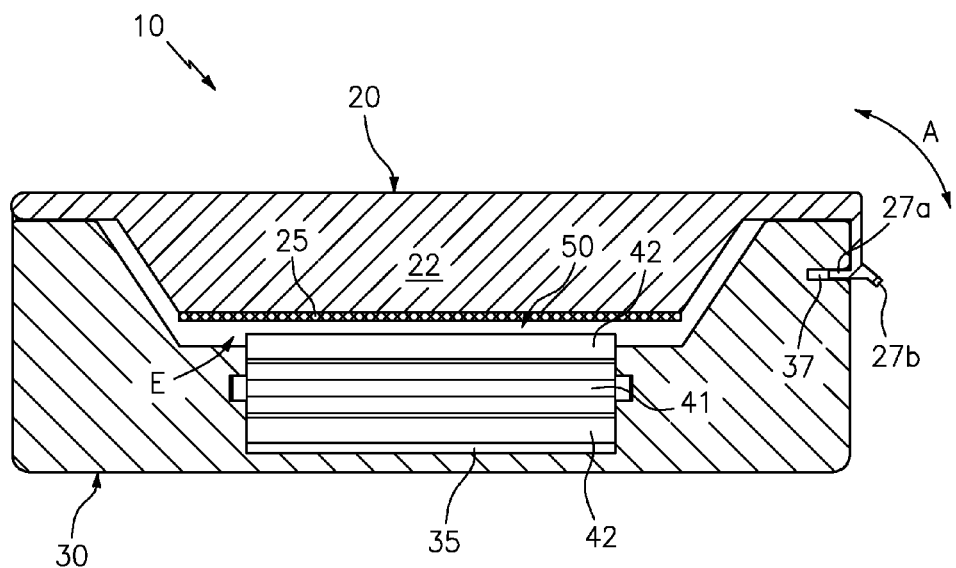
FIG. 5 is a side view of the seatbelt tension adjustment device in a closed position, in accordance with one embodiment of the invention.

FIG. 5 illustrates one embodiment of the device 10 in a closed position wherein the upper body is folded across the lower body until the inward facing protrusion 27a is engaged with the clip receiver 37. When the device is to be opened, the outward facing protrusion 27b can act as a lip for allowing a user to pull the inward facing protrusion 27a away from the clip receiver 37.

When the device is in the closed position, a channel 50 will exist between the lowermost section of the protrusion 22 of the upper body and the top surface 31a of the lower body. This channel will be utilized to receive an automotive seatbelt.

Figure 6:
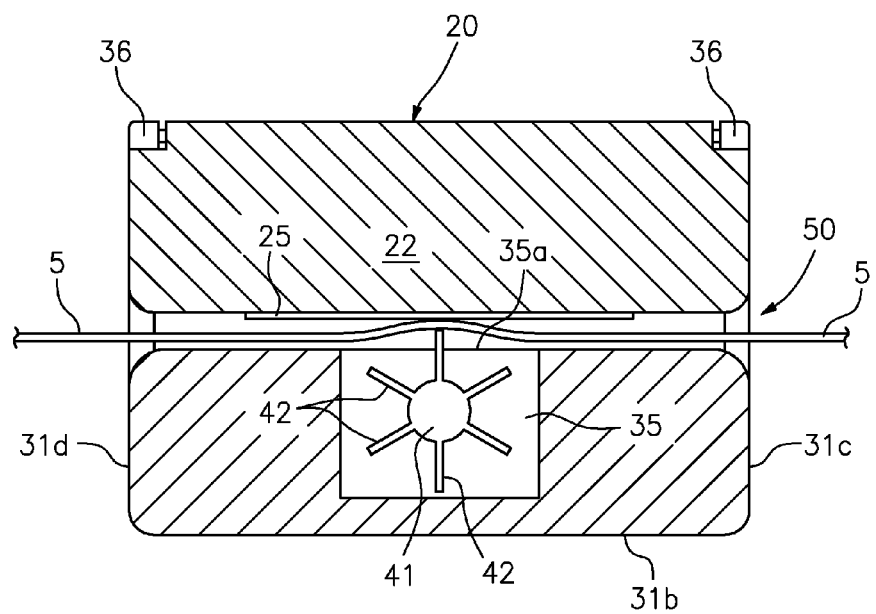
FIG. 6 is an end side view of the seatbelt tension adjustment device in operation, in accordance with one embodiment of the invention.

As illustrated in FIG. 6, a seatbelt 5 can be placed onto the top surface of the lower body 31a and the upper body 20 can then be closed. When so positioned, the seatbelt 5 will be sandwiched between the cushion pad 25 of the upper body protrusion 22, and the uppermost paddle 42 which extends through the opening 35a and into the channel 50. Such a feature will allow the paddle 42 to push the seatbelt 5 into the cushion pad 25 in order prevent the device from unintentionally sliding along the seatbelt.

Although the dimensions of the elements are not critical, a series of preferred dimensions are provided below. While the plain meaning of the below terms should be sufficient for those of skill in the art, for clarification purposes only, the term "length" can refer to the device from end side 31e to end side 31f, the term "height" can refer to bottom surface 31b to the top surface 21a and the term "width" can refer to sides 31c to 31d.

In the preferred embodiment the device 10 can include an overall length of approximately 3 inches, an overall height in a closed orientation of approximately ¾ inches, and an overall width of approximately 1 inch.

Both the bottom surface 22a of the upper section protrusion 22, and the top surface 31a of the lower body 30 can include a length of approximately 2 inches and a width of approximately 1 inches.

The seat belt channel 50 will preferably include a height of approximately ¼ inches, a length of approximately 2 inches and a width of approximately 1 inches.

The cavity 35 can preferably include a height of approximately ⅜ inches, a width of approximately ⅜ inches, and a length of approximately 1.5 inches.

The paddle drum 40 can preferably include a length of approximately 1 and ⅜ inches, an outside diameter of approximately ¼ inches. Each of the paddles 42 can preferably include a width of approximately ¼ inches and a length of approximately 1 and ⅜ inches.

Figure 7:
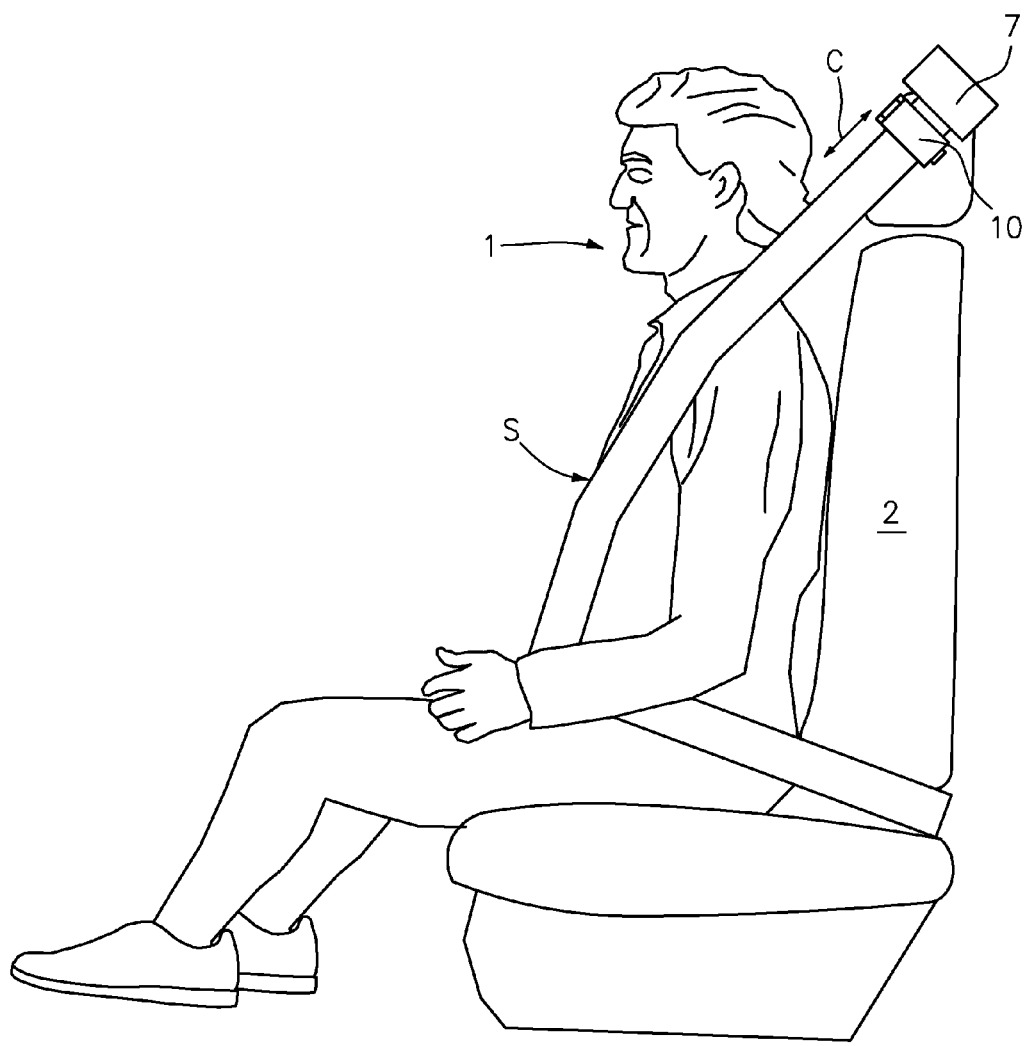
FIG. 7 is a perspective view of the seatbelt tension adjustment device in operation, in accordance with one embodiment of the invention.

FIG. 7 illustrates one embodiment of the device 10 in operation. As shown, the device 10 can be adjusted by sliding the device, see arrow C, towards or away from the pillar loop 7 of the vehicle. During this sliding motion, the drum 40 will rotate (see arrow B) in order to allow the paddles 42 to engage the seatbelt as described above.

In operation, the device 10 can be positioned against the pillar loop 7 of the vehicle, and the user can pull the seatbelt through the opening 50 until a desired belt tension is achieved. As described herein, belt tension can also include an amount of slack S between the users body 1 and the seatbelt 5 while the user is in an automotive seat 2. At this point, the device 10 will utilize the natural pulling force of the seatbelt system to remain in contact with the pillar loop 7 while simultaneously maintaining spacing S during normal driving operation.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually described components can be constructed with other individually described components to form one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

What is claimed is:

1. A seatbelt tension adjustment device for adjusting a tension imparted onto a user of a seatbelt, said device comprising:
    an elongated upper body having a top surface, a bottom surface, a first end and a second end, said bottom surface including a downward facing protrusion extending from a middle section thereof;
    a lower body having a top surface, a bottom surface, a first end, a second end, and a pair of side surfaces defining an interior space, said top surface including a pair of upward facing protrusions located adjacent to the first end and the second end,
    wherein the downward facing protrusion of the upper body and the upward facing protrusions of the lower body form a channel for receiving the seatbelt when the device is in a closed position;
    a cavity formed within the interior space of the lower body, said cavity having an opening located along a center portion of the top surface of the lower body;
    a paddle drum that includes an elongated cylindrical member having a pair of opposing ends and a plurality of evenly spaced orthogonally oriented paddles disposed thereon, said paddle drum being positioned within the cavity in a rotatable manner in which a portion of at least one of the plurality of paddles extends through the cavity opening and into the channel; and
    an attachment unit configured to secure the upper and lower bodies together in order to allow the device to transition between an open position and a closed position.

2. The seatbelt tension adjustment device of claim 1, further comprising:
    a cushion pad secured onto the downward facing protrusion of the upper body.

3. The seatbelt tension adjustment device of claim 2, wherein said cushion pad is constructed from at least one of a rubber strip, neoprene and cotton.

4. The seatbelt tension adjustment device of claim 1, further comprising:
    a retention clip positioned adjacent to the second end of the upper body, said retention clip having a generally orthogonal relationship with the upper body and further including an inward facing protrusion and an outward facing protrusion disposed onto a distal end thereof; and
    a clip receiver having a cavity for receiving the inward facing protrusion of the retention clip, said receiver being positioned along the second end of the lower body, wherein said retention clip and clip receiver are configured to secure the device in the closed position.

5. The seatbelt tension adjustment device of claim 1, further comprising:
- a pair of nipples disposed on the opposing ends of the paddle drum; and
- a pair of drum receivers disposed along opposite ends of the cavity of the lower body, said drum receivers being configured to receive the nipples and to allow the paddle drum to freely rotate.

6. The seatbelt tension adjustment device of claim 1, wherein each of the upper body and the lower body are constructed from single molds of injected plastic.

7. The seatbelt tension adjustment device of claim 1, wherein each of the plurality of paddles are constructed from rubber that is configured to grip the seatbelt in a nonslip manner.

8. The seatbelt tension adjustment device of claim 1, wherein the paddle drum is constructed from a single mold of injected plastic and includes six paddles.

9. The seatbelt tension adjustment device of claim 8, wherein each of the paddles further includes a rubber coating applied thereon, said rubber coating being configured to grip the seatbelt in a nonslip manner.

10. The seatbelt tension adjustment device of claim 1, wherein the device includes an overall length of approximately 3 inches, an overall height in a closed position of approximately ¾ inches and an overall width of approximately 1 inch.

\* \* \* \* \*